United States Patent [19]
Brown et al.

[11] Patent Number: 5,124,856
[45] Date of Patent: *Jun. 23, 1992

[54] MAGNETIC RECORDING DEVICE WITH UNITARY FILTER MEDIUM TO TRAP ORGANIC AND INORGANIC CHEMICAL POLLUTANTS

[75] Inventors: Charles A. Brown, San Jose; Leo Volpe, Palo Alto; Herman R. Wendt, San Jose, all of Calif.

[73] Assignee: International Business Machines Corporation, Armonk, N.Y.

[*] Notice: The portion of the term of this patent subsequent to Jul. 9, 2008 has been disclaimed.

[21] Appl. No.: 562,189

[22] Filed: Aug. 3, 1990

[51] Int. Cl.$^5$ .................. G11B 33/14; B01D 50/00; B01J 20/02; D01F 9/12
[52] U.S. Cl. .................. 360/97.03; 360/97.02; 55/316; 55/385.6; 502/416; 423/230; 423/447.1
[58] Field of Search .......... 360/97.02–97.04; 422/122; 423/447.1, 230; 502/180, 417, 416; 428/367; 55/527, 316, 486, 385.6; 131/342; 210/290, 504

[56] References Cited

U.S. PATENT DOCUMENTS

| | | | |
|---|---|---|---|
| 3,969,268 | 7/1976 | Fukuda et al. | 502/425 |
| 4,195,549 | 4/1980 | Noguchi et al. | 131/342 |
| 4,489,356 | 12/1984 | Farmer | 360/97.03 |
| 4,576,929 | 3/1986 | Shimazaki | 502/417 |
| 4,684,510 | 8/1987 | Harkins | 423/210 |
| 4,696,742 | 9/1987 | Shimazaki | 210/287 |
| 4,772,455 | 9/1988 | Izumi et al. | 55/527 |
| 4,863,499 | 9/1989 | Osendorf | 360/97.02 |
| 4,988,903 | 1/1991 | Koriyama | 360/97.02 |
| 5,030,260 | 7/1991 | Beck et al. | 360/97.02 |

OTHER PUBLICATIONS

The Kirk-Othmer Encyclopedia of Chemical Technology, vol. 16, Third Edition, published by John Wiley & Sons, Inc., at pp. 125–138, "Novoloid Fibers".

*Primary Examiner*—Aristotelis Psitos
*Assistant Examiner*—Jefferson Evans
*Attorney, Agent, or Firm*—Henry E. Otto, Jr.

[57] ABSTRACT

A chemical filter assembly mounted in a breather opening in a housing for a magnetic storage device or other device to permit pressure equalization with the surrounding environment comprises at least one filter medium for removing particulate matter, and a unitary filter medium of a fabric of activated carbon fibers that is impregnated with a chemical that in combination with the carbon provides protection against both organic and inorganic gaseous or vapor pollutants, said fibers having a pore size small enough prevent significant penetration by aqueous solutions so that during impregnation the pores will not become clogged with the chemical.

14 Claims, 6 Drawing Sheets

MAGNETIC RECORDING DEVICE WITH UNITARY FILTER MEDIUM TO TRAP ORGANIC AND INORGANIC CHEMICAL POLLUTANTS This invention relates to chemical filters, and more particularly to a chemical filter, such as a breather filter for a magnetic recording device, having a single medium for trapping both organic and inorganic chemical pollutants.

BACKGROUND OF THE INVENTION

Current disk files or direct access storage devices (DASD) are susceptible to chemically-induced failure. Organic vapors and corrodents may damage DASD performance. Organic vapors induce stiction at the interface between magnetic heads and disks. Corrodents can damage read/write heads and induce errors in thin film disks.

The copending application, U.S. Ser. No. 07/445,818, filed Dec. 4, 1989, now U.S. Pat. No. 5,030,260 granted Jul. 9, 1991 assigned to the assignee of the present invention, discloses a breather filter for a magnetic recording direct access storage device. The breather filter is mounted in a breather opening in an otherwise sealed (except for leaks) head/disk housing. The opening permits pressure within the housing to equalize with that of the ambient environment as pressure within the housing changes during start-up, operation, and shut down.

The breather filter as disclosed in this cited copending application comprises a prefilter medium for trapping particulate pollutants, one chemical filter medium of activated carbon fabric to trap undesired organic gases, a separate optional chemical filter medium to trap undesired inorganic gases, and a high efficiency particulate air (HEPA) final filter to trap particulate matter.

The application suggests that alternatively the particulate prefilter can be treated to trap inorganic gaseous pollutants. This in fact has been done in IBM DASD devices now on the market, wherein a fiberglass filter medium was treated with sodium carbonate to remove hydrogen chloride for preventing corrosion of Permalloy poletips in the read/write heads. At high humidity this treated fiberglass prefilter offers good protection against atmospheric sulfur dioxide but relatively poor protection against nitrogen dioxide and hydrogen sulfide. Also, the pressure drop through this treated fiberglass filter is relatively high, resulting in a correspondingly high pressure drop across the composite breather filter assembly. Prior to this invention, only particulate filter media of fiberglass were found to be treatable to provide protection against inorganic gaseous pollutants.

The Kirk-Othmer Encyclopedia of Chemical Technology, Vol. 16, Third Edition, published by John Wiley & Sons, Inc., at pp. 125-138 has a section entitled "Novoloid Fibers". At pp. 136-137 there is described a novoloid-based activated carbon fiber (hereinafter "activated carbon fiber") which is formed by a one-step process combining both carbonization and activation, in an oxygen-free atmosphere containing steam and/or $CO_2$ at about 900° C. Pore radius distribution shows a single peak at about 1.5-1.8 nm (15-18 Angstroms, and thus a pore diameter of 30-36 Angstroms). As noted in the above-cited copending application, activated carbon fiber has been used as a filter medium to remove organic pollutants. However, there is no suggestion or teaching that activated carbon fibers could be treated with a chemical that in combination with the activated carbon provides a filter medium that removes both organic and inorganic gaseous or vapor pollutants.

The above constitutes the most pertinent prior art of which applicants are aware.

Of incidental interest is U.S. Pat. No. 4,684,510 which discloses a chemical breather filter for a magnetic storage device. The filter comprises a charcoal layer incorporated in a polyester or polyurethane foam to trap organic contaminants, one or more metal layers (such as copper or nickel mesh) to remove inorganic pollutants, and a particle-removing layer.

It is important that the pressure drop across the breather filter assembly be as low as possible so that any air drawn into the head/disk assembly housing will be drawn in through the breather filter and flow out through leak points (if any). As the pressure drop across the filter assembly increases, there is an increased likelihood that other leak paths into the interior of the housing via a gasket or other seal can permit contaminated air to be drawn into the housing in bypass of the filter.

There is a need for an improved inexpensive, single medium filter of reduced size which (a) prevents exposure of a device to both organic and inorganic chemical contaminants, (b) provides superior low humidity performance against corrosive gases, (c) eliminates the need for sodium carbonate-treated fiberglass filter media, and (d) provides corrosive protection with a significantly lower pressure drop than heretofore possible.

SUMMARY OF THE INVENTION

Toward this end and according to the invention, a magnetic recording device with a unitary filter medium is provided for use in a chemical breather filter assembly mounted in a breather opening in the housing of a magnetic disk file or other device to permit pressure equalization with the surrounding environment. The medium comprises a thin fabric including activated carbon fibers. The medium is impregnated with a chemical that in combination with the carbon provides, in a synergistic manner, protection against both organic and inorganic gaseous or vapor pollutants. The pore size of the activated carbon fibers small enough to prevent significant penetration into the pores by aqueous solutions so that during impregnation the pores will not be clogged with the chemical.

DESCRIPTION OF PREFERRED EMBODIMENT

Figure 1:
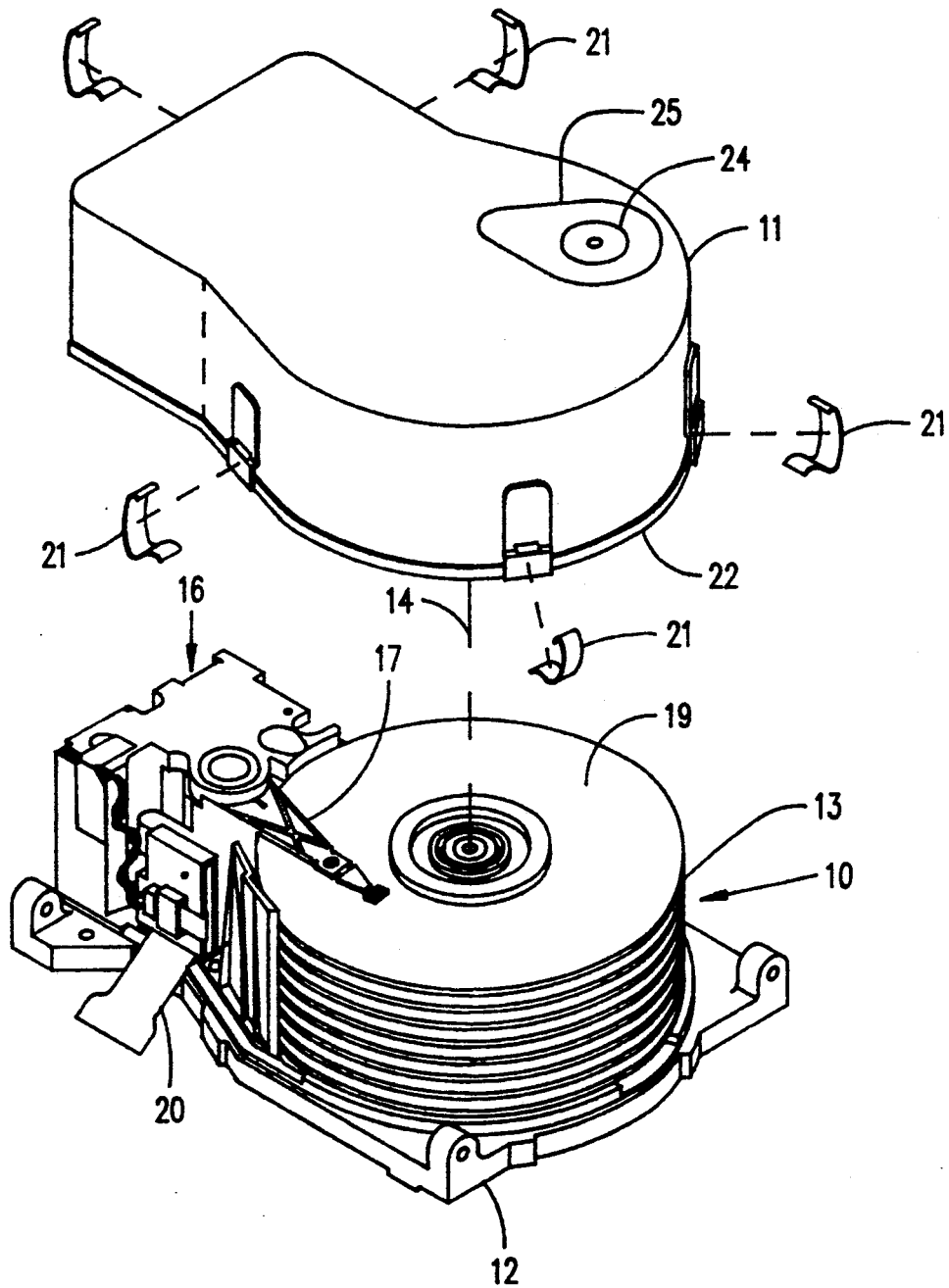
FIG. 1 depicts a typical disk drive (with cover removed), including a chemical breather filter assembly embodying the invention.

The magnetic recording device embodying the invention is illustrated in FIG. 1 as including a chemical breather filter assembly which is applied to a magnetic direct access storage device 10, shown with its cover 11 removed. Device 10 comprises a base 12 which supports a stack of axially spaced disks 13 that rotate in unison about a common axis 14. An actuator assembly 16 supports a series of transducer-carrying arms 17 which access the data storage surfaces 19 of the disks 13. A flat cable 20 interconnects electronics contained within the head-disk assembly housing with the drive circuit card outside the housing. Cover 11 is secured to base 12 by a series of clips 21 which compress a gasket 22 to effect a seal between the cover and base. As illustrated, chemical breather filter assembly 24 embodying the invention is mounted in cover 11, to which it is secured by an external tape element 25.

Figure 2:
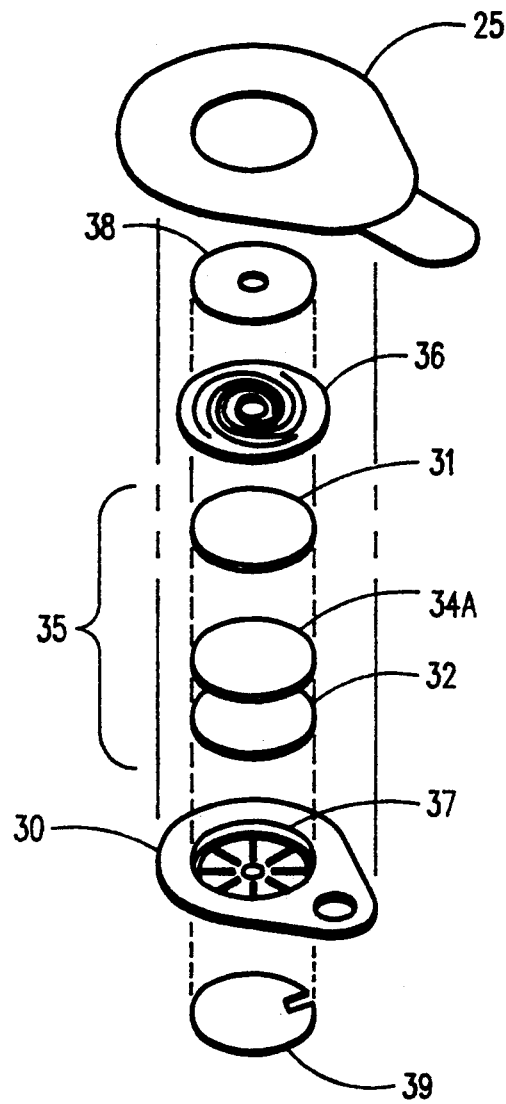
FIG. 2 is an exploded view of the chemical filter assembly, including its unique filter medium.

Referring now to FIG. 2, the breather filter assembly 24 comprises a bottom housing 30; a multiple layer filter medium 35 comprising a prefilter medium 31 and a HEPA particulate filter medium 32; and a diffusion plate 36. Plate 36 is received in a recess 37 in the bottom housing 30 and attached thereto to retain the composite filter media 35. Filter assembly 24 also includes a tape top 38 and a bottom cover 39. Assembly 24 is secured and sealed in position on the disk drive cover 11 by tape element 25.

The storage device 10 and filter assembly 24 as thus far described are identical with those shown in the above-cited application, the pertinent portions of which are incorporated herein by reference. For ease in understanding, the same reference numerals have been used in this application as in the above-cited application to identify like components. The configuration of the bottom plate 30 and diffusion plate 36 may be as in the above-cited application; and since they form no part of the present invention, they will not be described in detail.

According to the invention, filter medium 35 consists of only a single chemical filter medium 34A between the prefilter medium 31 and HEPA filter medium 32. Medium 34A comprises an activated carbon fiber fabric which not only is capable of trapping organic gaseous and vapor pollutants but is treated and impregnated with a chemical in the manner now to be described in order also to trap inorganic gaseous and vapor pollutants. The fabric of activated charcoal fibers is commercially available and is made in the manner described above.

The improved unitary chemical filter medium was prepared as follows:

1. A solution of sodium carbonate ($Na_2CO_3$) was prepared from 1 part carbonate and 100 parts water.
2. A piece of cut Kynol activated carbon fabric (trade name of American Kynol Inc., New York) having activated carbon fibers with a pore size diameter of 20-25 Angstroms was immersed in a vat containing the sodium carbonate solution such that all parts of the fabric were covered and wet.
3. The fabric was allowed to remain exposed to the solution for a period of 3 to 5 minutes. (Longer times were found to not have any negative effect.)
4. The treated Kynol fabric was removed from the solution and allowed to drain excess liquid for $\frac{1}{2}$ to 2 minutes.
5. The treated fabric was then placed on an open mesh expanded polytetrafluorthylene screen in a drying oven at 70 to 100 degrees Celsius for 30-60 minutes to form the unitary filter medium embodying the invention.

Unitary filter media with 2.5 to 3.5% $Na_2CO_3$ by weight were obtained using the process just described. The Na percentage was 2.5 to 3.0% with light weaves of activated carbon fabric, and 3.0 to 3.5% with heavy tight weaves of activated carbon fabric.

It was found that a relationship exists between $Na_2CO_3$ concentration in solution and weight percent on the fabric. For example, a 2% $Na_2CP_3$ solution yields a unitary filter medium with 5.0 to 7.0% $Na_2CO_3$ by weight; whereas a solution with 0.4% $Na_2CO_3$ yields a unitary filter media with 1 to 1.3% $Na_2CO_3$ by weight.

Figure 3:
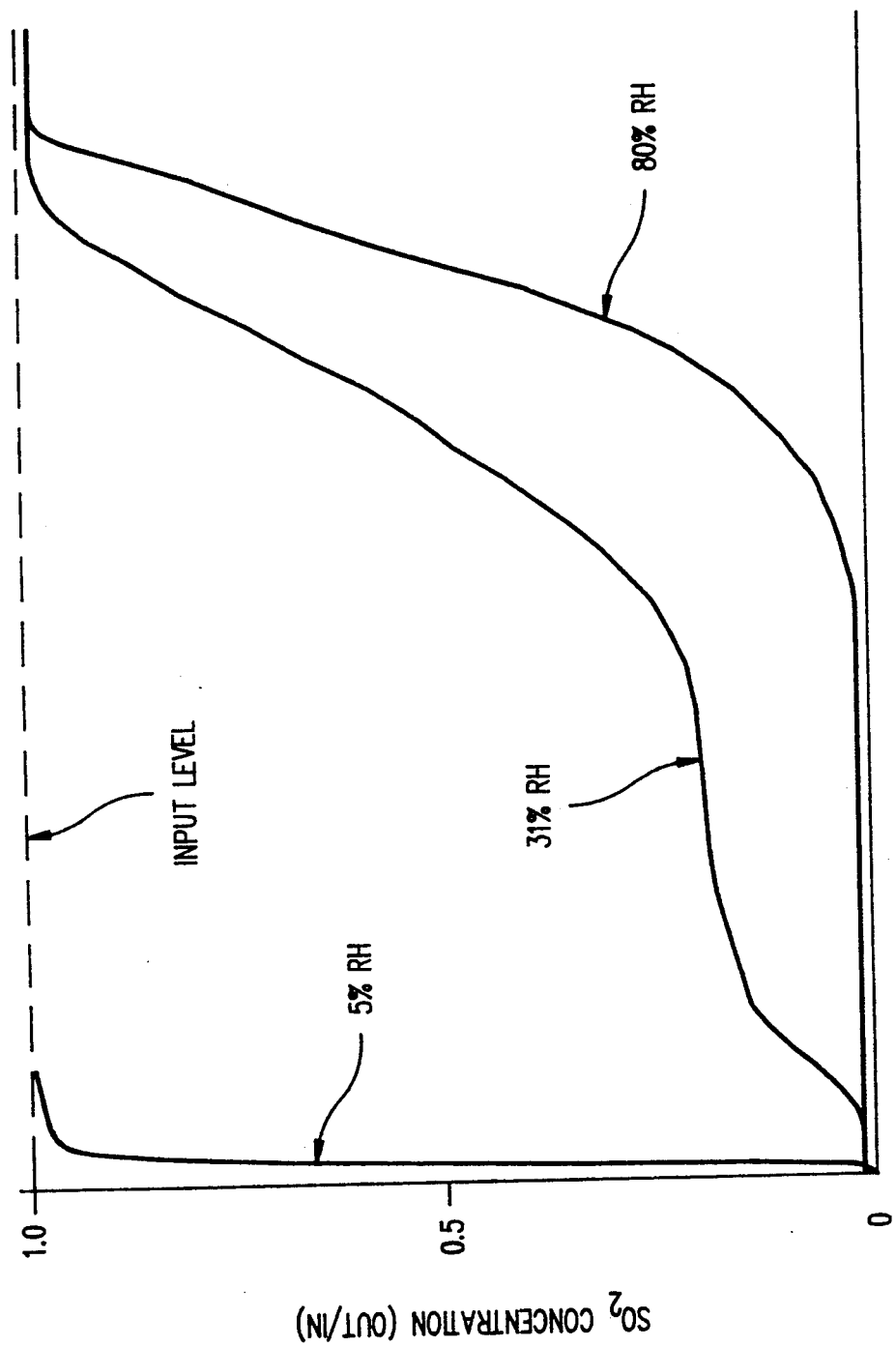
FIGS. 3-5 are plots of the out/in ratios of sulfur dioxide concentration vs. time showing the results of identical accelerated corrosive gas tests at various relative humidities on a sodium carbonate-treated fiberglass filter medium (FIG. 3), on an activated carbon fabric filter medium (FIG. 4), and on an activated carbon fabric filter medium chemically treated with sodium carbonate in accordance with the invention (FIG. 5)
Figure 4:
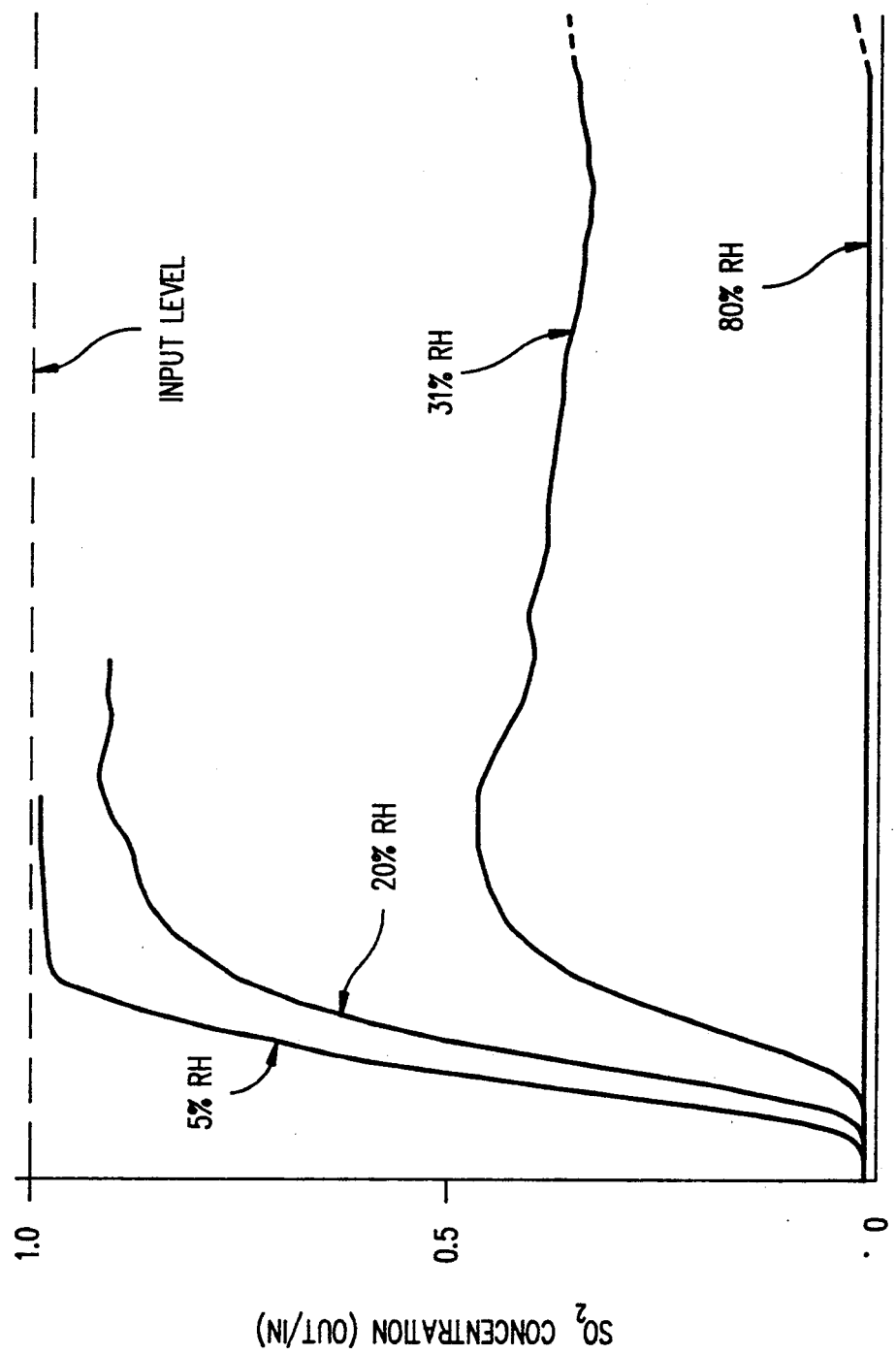
Figure 5:
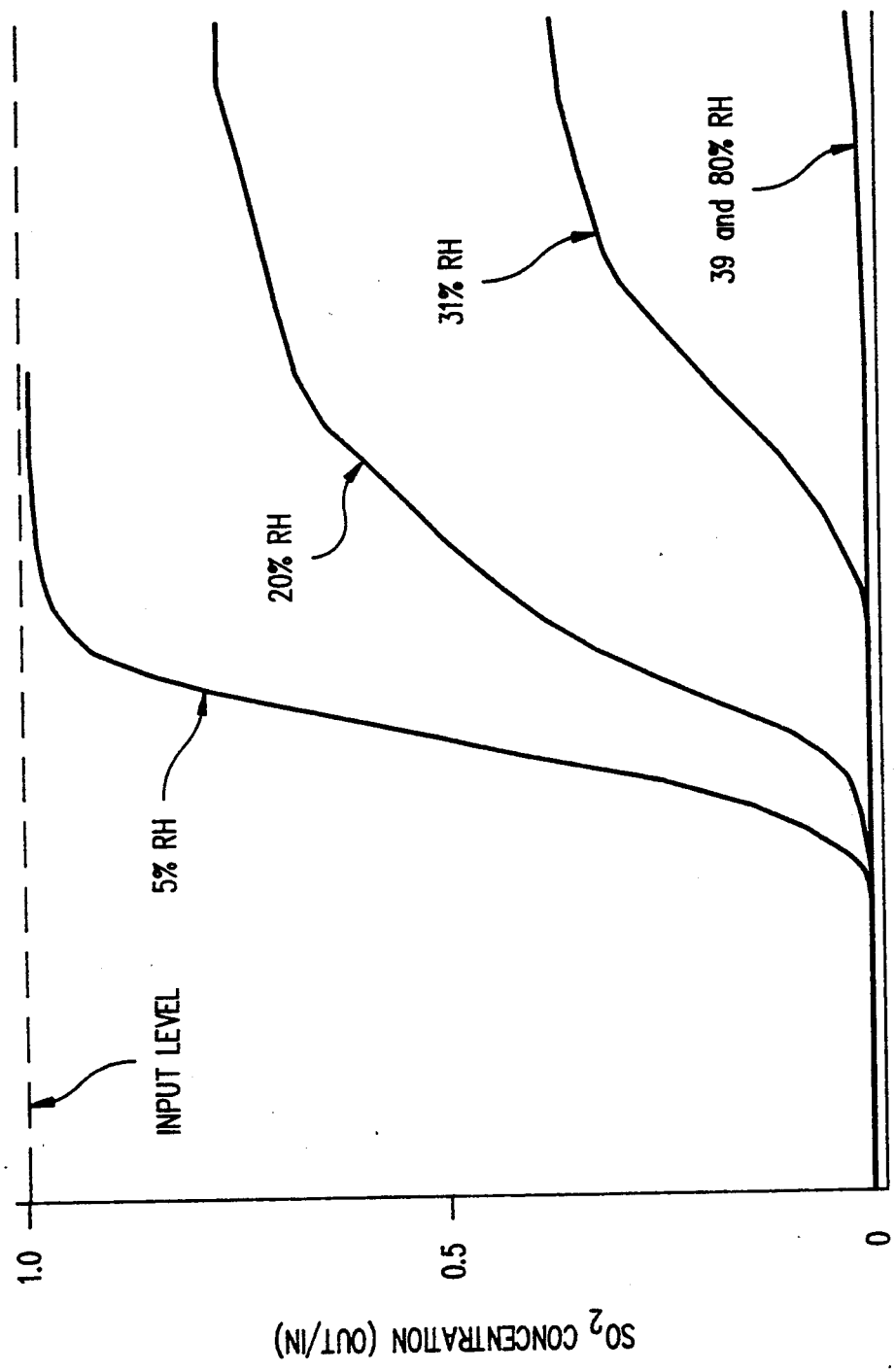

Identical accelerated corrosive gas comparison tests were conducted on the following filter media at similar relative humidities, with the results as shown in FIGS. 3, 4 and 5:

Medium A—Fiberglass treated to contain 2.4% by weight of $Na_2CO_3$ (see FIG. 3);

Medium B—Activated carbon fabric untreated with $Na_2CO_3$ (see FIG. 4); and

Medium C—Activated carbon fabric treated to contain 2.4% by weight of $Na_2CO_3$ in the manner above described (see FIG. 5). Media B and C were identical except for the $Na_2CO_3$ treatment applied to Medium C.

In these comparison tests, air containing corrosive sulfur dioxide gas was flowed at 50 cc/min through 2.2 cm diameter disks of the respective media A,B,C. Relative humidity of the sulfur dioxide gas was varied from 5% to 80%, and the exit sulfur dioxide concentration was continuously monitored.

Note that the desired maximum out/in ratio or "pass level" for an acid gas like sulfur dioxide would be about 1-2%. Thus it is the initial rise above this level which is important, not the time to reach 100%. From FIGS. 3-5, it will be noted that at 31% relative humidity, media A and B show this initial rise much sooner than medium C. At high (80%) relative humidity, media B and C were considerably more efficient than medium A. Analysis of medium B after the experiments at 31% and 80% relative humidity showed that it contained sulfuric acid. The sulfur dioxide and the water vapor in the air had reacted to generate this acid in the medium. Sulfuric acid is undesirable in a breather filter because it has a finite vapor pressure. Medium C did not have any such sulfuric acid; it had only harmless sodium sulfate.

In summary, medium C is superior to media A and B because (a) it stops acid gases longer at low and medium relative humidity; (b) it stops acid gases longer than medium A at high relative humidity; (c) it does not generate sulfuric acid as does medium B; and (d) it provides low pressure drop comparable to that of medium B.

Figure 6:
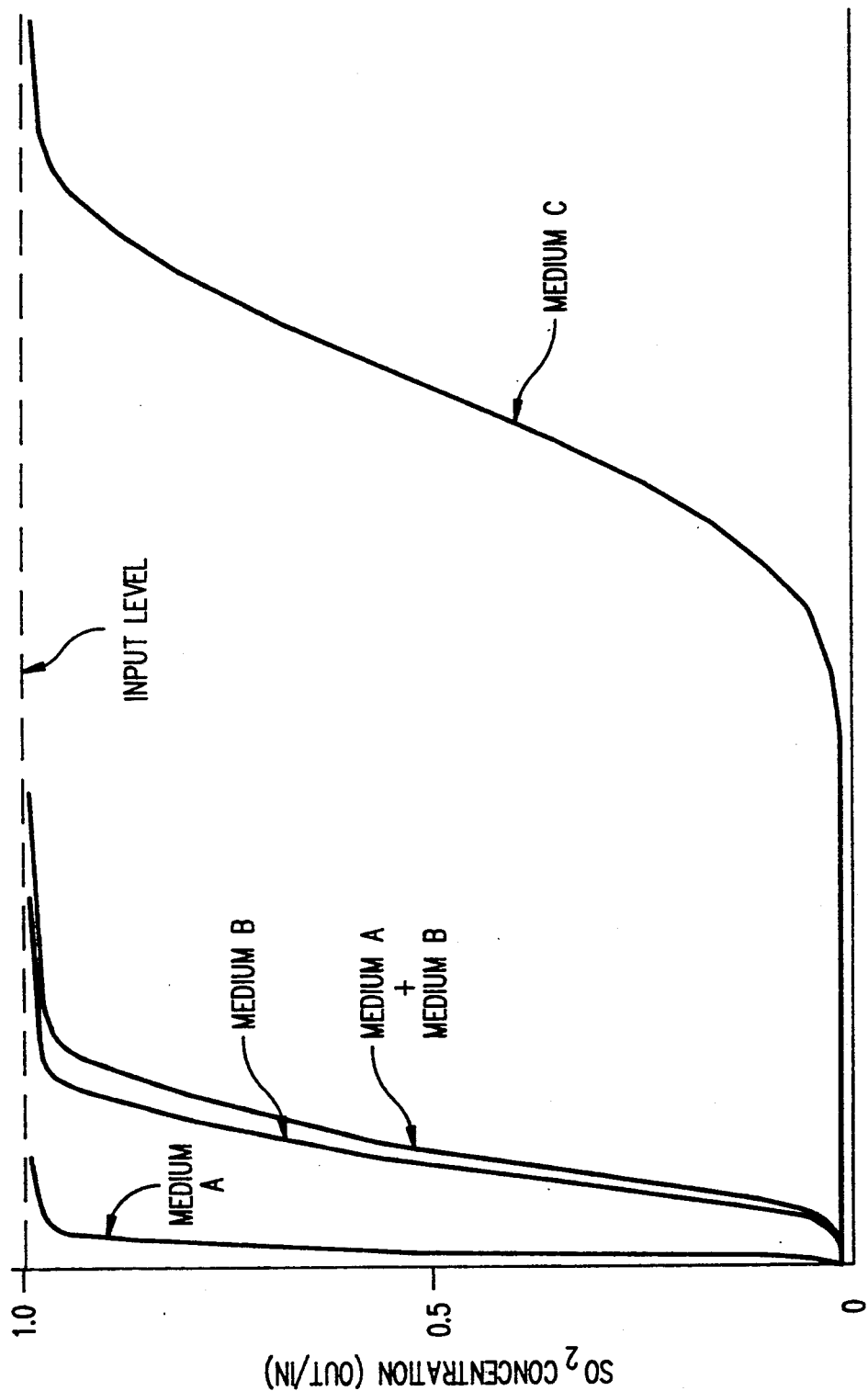
FIG. 6 is a plot of the ratios of sulfur dioxide concentration out/in vs. time at a relative humidity of 5% comparing the results for the three media whose test results were individually shown in FIGS. 3, 4 and 5, respectively, and for a combination of the media of FIGS. 3 and 4.

In fact, as shown by FIG. 6, medium C, the activated carbon treated with sodium carbonate in accordance with the invention, exhibited an unexpected synergistic result in that it performed better than media A and B in combination; i.e., better than an active carbon layer in combination with a separate layer of sodium carbonate-treated fiberglass.

The pressure drop divided by air stream face velocity (as measured in kilo Pascal sec/cm) was 0.032 for the sodium carbonate-treated fiberglass (medium A); but was 0.0025 for both the untreated and treated activated carbon cloth (media B and C). Thus, the pressure drop was reduced by more than an order of magnitude when substituting applicants' treated activated carbon cloth for the sodium carbonate-treated fiberglass.

To evaluate the effectiveness of media B and C in eliminating organic pollutants, a standard accelerated breather filter organic performance test was conducted. Each of the filter media B and C was challenged with a 2 cc/min flow of trimethyl pentane vapor, with the acceleration being achieved by increasing the vapor concentration. Media B and C were prepared from the same activated carbon fiber with (as before stated) the only difference being in that medium C was treated with sodium carbonate. The results showed that the sodium carbonate impregnation had an essentially negligible effect on the lifetime of the medium C.

It is important to note that the fabric of activated carbon fibers used to implement the invention should have a pore size diameter small enough (somewhat less than 40 Angstroms) so that aqueous solutions cannot penetrate significantly due to surface tension. This will assure that the pores will not become plugged by solid sodium carbonate when the water evaporates following impregnation of the fabric in the manner above described. The sodium carbonate apparently accumulates at the fiber-to-fiber contact points in the activated charcoal fabric. By contrast, conventional granular activated carbon has a pore structure which begins at the surface with very large macropores that can become plugged and block the entire internal structure associated with that macropore. Organic/acid gas cartridges for respirators, which contain granular carbon, are therefore made with two separate carbon layers; namely, a base-treated carbon for the acid gas, and an untreated activated carbon for organic pollutants.

The term "fabric" as herein used and used in the claims is intended generically to cover woven or nonwoven materials, including those comprising a mixture of fibers.

The invention has thus far been described as implemented by treating activated carbon fabric with sodium carbonate to trap sulfur dioxide; however, it will also trap other corrosive acid gases such as hydrochloric acid or nitrogen oxides (e.g., NO or $NO_2$) Also, a treatment similar to that described in connection with sodium carbonate may be used to apply other chemicals to an activated carbon fabric to enhance trapping of selected chemical contaminants. For example, transition metal sulfates, such as iron sulfate or copper sulfate, may be used to trap ammonia or a low molecular weight amine, such as methylamine. Or, if preferred, lead salts, such as lead acetate, can be used to trap sulfides. Experiments have also shown that high molecular weight water soluble polymers can be applied to the activated carbon fabric without materially reducing organic performance. Polymeric amines, such as polyethylene imine, can be used to trap acidic gases; and polymeric acids, such as polyacrylic acid or polysulfonic acid, can be applied for trapping of basic gases. Polymeric salts, such as partially or fully neutralized sodium polyacrylic acid may also be used to trap acid gases. Colloidal materials suspended in water, which are similar to high surface tension low molecular weight solutions, could also be used to modify the activated carbon fabric to provide other forms of chemical protection without materially adversely affecting the organic adsorption performance.

While this invention has been shown and described with respect to one form of preferred embodiment thereof, it will be understood by those skilled in the art that changes in form and detail may be made without departing from the scope and teaching of this invention. Accordingly, the chemical filter assembly and treatment method herein disclosed are to be considered merely as illustrative, and the invention is to be limited only as specified in the claims.

We claim:

1. In a magnetic recording storage device of the type enclosed by a housing means with a breather opening to permit pressure equalization with the surrounding environment, the combination with said housing means of a chemical filter assembly mounted in a path through which a fluid flows through said opening and comprising at least one filter medium for removing particulate pollutants from the fluid, and a unitary filter medium of fabric that contains activated carbon fibers having a pore size small enough to prevent significant penetration by aqueous solutions and is impregnated with a chemical that in combination with carbon in the carbon fibers provides protection against both organic and inorganic gaseous or vapor pollutants.

2. The combination of claim 1, wherein the pore size diameter does not exceed 40 Angstroms so as to insure that said chemical will not clog the pores of the fibers when the fabric is impregnated.

3. The combination of claim 1, wherein the chemical in the filter assembly is a water soluble metal carbonate.

4. The combination of claim 1, wherein the chemical in the filter assembly is a water soluble metal bicarbonate.

5. The combination of claim 1, wherein the chemical in the filter assembly is a soluble metal salt of a monomeric or polymeric organic acid.

6. The combination of claim 1, wherein the chemical in the filter assembly is a soluble metal salt of an inorganic acid such as phosphoric acid.

7. The combination of claim 1, wherein the chemical in the filter assembly is sodium carbonate to trap corrosive acid gases, such as sulfur dioxide, hydrochloric acid or nitrogen oxides.

8. The combination of claim 1, wherein the chemical in the filter assembly is a transition metal sulfate to trap ammonia or a low molecular weight amine.

9. The combination of claim 1, wherein the chemical in the filter assembly is a lead salt to trap sulfides.

10. The combination of claim 1, wherein the chemical in the filter assembly is a polymeric amine to trap acidic gases.

11. The combination of claim 1, wherein the chemical in the filter assembly is a colloidal material.

12. A magnetic recording storage device of the type comprising a head/disk assembly contained within a housing means having a breather opening to permit pressure equalization between the interior of the housing means and the surrounding environment and further comprising a chemical filter assembly mounted in a path through which a fluid flows through said opening, wherein the improvement comprises a fabric containing activated carbon fibers located in the filter assembly and having a pore size small enough to prevent significant penetration by aqueous solutions of the fluid, said fibers being impregnated with a chemical that in combination with the carbon fabric traps both organic and inorganic gaseous or vapor pollutants.

13. The device of claim 12, wherein the filter assembly also includes at least one HEPA filter to trap particulate pollutants.

14. The device of claim 12, wherein the activated carbon fibers have a pore size diameter not exceeding 40 Angstroms.

* * * * *